(12) United States Patent
King, Jr.

(10) Patent No.: US 8,793,835 B2
(45) Date of Patent: Aug. 5, 2014

(54) SYSTEM AND METHOD FOR CAPTURING RESULTANT DUST FROM POWER TOOL OPERATION

(76) Inventor: Jack M. King, Jr., Phoenix, AZ (US)

( * ) Notice: Subject to any disclaimer, the term of this patent is extended or adjusted under 35 U.S.C. 154(b) by 736 days.

(21) Appl. No.: 13/086,334

(22) Filed: Apr. 13, 2011

(65) Prior Publication Data

US 2012/0260456 A1    Oct. 18, 2012

(51) Int. Cl.
*A47L 9/00* (2006.01)
*B23Q 11/00* (2006.01)
*B24B 55/10* (2006.01)
*B23D 59/00* (2006.01)

(52) U.S. Cl.
CPC .......... *B23D 59/006* (2013.01); *B23Q 11/0046* (2013.01); *B24B 55/10* (2013.01)
USPC .................. 15/339; 15/421; 83/100; 173/198; 408/67; 451/456

(58) Field of Classification Search
USPC ......... 15/339, 421; 83/100; 173/78, 198, 199; 408/67; 451/456; 144/253.1
See application file for complete search history.

(56) References Cited

U.S. PATENT DOCUMENTS

| 4,192,104 A | 3/1980 | Patenaude |
| 5,228,244 A | 7/1993 | Chu |
| 5,440,809 A | 8/1995 | Padilla |
| 5,833,524 A | 11/1998 | Satoh |
| 6,079,078 A | 6/2000 | Byington |
| 6,514,131 B1 | 2/2003 | Reich et al. |
| 6,641,634 B2 | 11/2003 | Reich et al. |
| 6,854,937 B1 | 2/2005 | Weiss |
| 7,281,886 B2 | 10/2007 | Stoerig |
| 7,740,086 B2 | 6/2010 | Bleicher et al. |
| 7,797,794 B2 | 9/2010 | Bleicher et al. |

*Primary Examiner* — David Redding
(74) *Attorney, Agent, or Firm* — Lisa Foundation Patent Law Clinic at Arizona State University

(57) ABSTRACT

A system and method for capturing resultant dust from power tool operation are disclosed. The system comprises a device that includes a housing with a substantially cylindrical shape. The housing has a first end that tapers to an opening for a tool bit and at least one suction port that opens into an interior volume of the housing. The housing has a second end configured to couple to a power tool. An air intake passage attaches to the exterior surface of the housing body such that an interior volume of the air intake passage connects to an interior volume of the housing. An exit passage is coupled to the air intake passage and is configured to couple to a vacuum.

18 Claims, 16 Drawing Sheets

SYSTEM AND METHOD FOR CAPTURING RESULTANT DUST FROM POWER TOOL OPERATION

BACKGROUND OF THE INVENTION

1. Field of the Invention

The present disclosure relates to power tool accessories, and more particularly to power tool accessories for capturing dust and debris.

2. Description of Related Art

The removal of flooring tile is a dirty and time-consuming process. Power driven chisels are often employed to speed the removal of the tile and its backing adhesive material. However, this process results in a large amount of dust and debris that is ejected into the ambient air. A large amount of preparation time is needed in order to protect surrounding areas from being contaminated with dust. Additionally, the health of those in the area is negatively affected by the dust. Furthermore, environmental regulations in certain areas prohibit the escape of the removed dust into the atmosphere.

In order to combat the dust, many tools have been conceived of Various apparatuses include encasing the operating end of a power tool with a housing and attaching a vacuum to the housing. In the majority of these tools, the housing is cylindrical and has a single large opening through which the dust is captured. The current state of the art has several shortcomings. First of all, the location of the vacuum attachment in the prior art does not maximize the location and direction of air flow in order to capture the most dust. Second, the large opening does not allow the tool to reach certain places, such as in corners and underneath cabinets. Third, the durability of many products on the market is suspect. Fourth, the cylindrical shape of the operating end of the apparatuses does not provide a stable base on which to move the tool along the floor. Fifth, some of the products would often get clogged with pieces of debris. Therefore, a need arose for the present invention.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. application Ser. No. 11/367,009 discloses a dust suppression boot for a percussive power tool attached to a vacuum source. The boot is comprised of a hollow body fitting over the operating end of a percussive power tool with a hollow arm designed to attach to a vacuum hose. One end of the boot is left open nearest the operating end of the power tool to suction dust into the hollow interior of the body of the boot. Dust is transferred into the arm, as its interior connects to the interior of the body of the boot, and then into a vacuum attached to the open end of the arm.

U.S. Pat. No. 5,228,244 discloses a pneumatic tool including a rotor and a Venturi tube to collect dust. A hood is built over the operating portion of a power tool. The hood is designed to lie flush with the surface the power tool is operating upon. The interior of the hood is hollow and the interior space connects to a vacuum hose for the removal of dust captured by the hood.

U.S. Pat. No. 5,440,809 discloses a dust collection apparatus for high speed grinders. A housing fits around the cutting element of a power tool lies fit flush with the surface being cut to prevent dust from escaping. The cutting element of the power tool is contained within the housing. Dust that is captured by the housing is removed from the device through an attached vacuum tube.

U.S. Pat. No. 5,833,524 discloses a dust collection system for a power tool with a suction cavity. A shroud entirely encompasses a tool bit and fits closely to the surface being acted upon. The interior of the shroud is attached to a tube which is designed to be fitted to a vacuum hose. Dust is captured inside the shroud and siphoned into the tube and out of the device by the suction of the vacuum attached to the tube.

U.S. Pat. No. 6,079,078 discloses a chip and dust collection apparatus attached to a machine tool having a spindle and a cutter. A hollow hood is fitted over a cutting bit of a power tool and fits flush with the surface being operated upon. The hood has an articulated portion designed to provide flex and maintain contact between the hood and the surface being operated upon. Dust and debris is trapped inside the hood and suctioned out of the device through a connected vacuum hose.

U.S. Pat. No. 6,514,131 discloses a power tool having a dust suction device integrated into its housing. The hollow interior housing of the power tool itself is designed to fit flush with the surface being operated on. Dust is collected in this housing due to its close relation to the surface. Dust is transferred from this interior hollow volume by a suction device integrated into the tool through an opening which leads to a dust collection box which is also part of the tool itself. Dust is collected in the dust collection box which must be emptied when full.

U.S. Pat. No. 6,641,634 discloses a manual machine tool including a vacuum device situated in its housing. The housing of the machine tool itself has a hollow portion that fits flush with the surface being operated upon by the tool. Dust is trapped inside this hollow portion and may be ejected into an attached dust box through an ejection opening.

U.S. Pat. No. 6,854,937 discloses a dust attachment which is used with a spiral saw power tool. A hollow attachment is fitted over the operating end of a spiral saw power tool with an airtight attachment furthest away from the operating end of the power tool. The end closest to the operating end of the power tool is hollow and collects dust from the operating end of the power tool through the same opening which allows the operating end of the power tool to reach the surface being operated upon. The forward end of the attachment, through which the operating bit of the power tool protrudes, is flat in one continuous plane and only has the single opening. Dust is removed from this interior volume through a hollow arm, the interior of which connects to the hollow interior of the attachment, by the suction force of an attached vacuum hose.

U.S. Pat. No. 7,281,886 discloses a suction device that is used with a power drilling tool with an aeration device fixedly connected by a suction conduit with the suction head. A hollow housing is fitted to the exterior of a power tool and does not encase any of the body of the power tool. One end of the housing forms a suction head around the tool bit and draws dust into the hollow body of the housing. This suction end lies flush with the surface being operated upon and only encompasses a portion of the operating bit nearest the surface. Dust is drawn to the opposite end of the housing by an internal fan driven by an electric motor internal to the device. Dust is accumulated in the end of the device housing the fan and motor.

U.S. Pat. No. 7,740,086 discloses a suction device for a hammer drill having a receiving space which partially encloses a working tool. The suction device attaches over the operating end of a pick power tool. One end of the device attaches to the body of the power tool while the other end has a plurality of holes which contact the surface being operated upon. A portion of the device is articulated to provide flexibility to the body of the device, which is hollow, and to maintain contact between the device and the surface being operated upon. Dust is drawn into the hollow body of the device through the holes that contact the surface, and out of the device through a single hollow connection for a vacuum hose.

U.S. Pat. No. 7,797,794 discloses a suction device for a pick power tool with a vacuum source and a baffle wall. The device is hollow and has two ends, the first of which is coupled to the pick power tool, the second end is elastic and extends around the operating bit of the pick power tool. The second end maintains contact with the surface being operated upon through the elasticity of the second end. The first and second ends are separated by an interior baffle. The hollow chamber formed by the second end is connected to a hollow connection element which can be attached to a vacuum hose. Dust is drawn into the second end and ejected from the device through the hollow connection element into the vacuum hose.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

The present invention provides among other things a device for collecting dust from a power tool. In one embodiment, the device includes a housing with a first end that tapers to an opening for a tool bit and at least one suction port that opens into an interior volume of the housing. The housing has an opposing second end configured to couple to a power tool. An air intake passage attaches to the exterior surface of the housing body such that an interior volume of the air intake passage connects to an interior volume of the housing. An exit passage is coupled to the air intake passage and is configured to couple to a vacuum.

In one embodiment, the first end of the device has at least two substantially planar surfaces.

In one embodiment, the device has a lip coupled to the first end of the housing.

In one embodiment, a clamp is coupled to the second end of the housing.

In one embodiment, the housing is substantially cylindrical.

In one embodiment, the device has a vent hole located on the housing.

In another embodiment, the invention discloses a power tool accessory for vacuuming dust. The accessory has a first face lying in a first plane and a second face lying in a second plane. The planes form an acute angle, and the faces are non-intersecting. At least one face defines a suction port. A casing is coupled to the faces and configured to couple to a power tool. At least one vacuum channel is coupled to an exterior surface of the casing, and an exit channel is coupled to the vacuum channel and configured to couple to a vacuum.

In one embodiment, the power tool accessory has a clamp to couple the casing to a power tool.

In one embodiment, both faces define a plurality of suction ports.

In one embodiment, the vacuum channel is curved.

In one embodiment, one of the faces forms an obtuse angle with the interior of the casing.

In one embodiment, the faces, the casing, and the vacuum channels comprise substantially the same material.

In one embodiment, the casing comprises steel.

In another embodiment, the invention discloses a method for manufacturing a device for collecting dust from a power tool. The method comprises providing a first angled surface and a second angled surface. The first and second angled surfaces define a plurality of suction holes and a tool bit opening. A sheath is provided, and the sheath is coupled to the first and second angled surfaces. The sheath is further configured to couple to a power tool. A pipe is provided, and the pipe is coupled to the sheath such that air may flow between the pipe and an interior volume of the sheath. An adapter is provided, and the adapter is configured to couple to a vacuum.

In one embodiment, the method includes coupling two pipes to the sheath.

In one embodiment, the sheath, the pipes, and the adapter are comprised of substantially the same material.

In one embodiment, a clamp is provided and coupled to an end of the sheath distal to the tool bit opening.

In one embodiment, the device is case-hardened or heat-treated.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
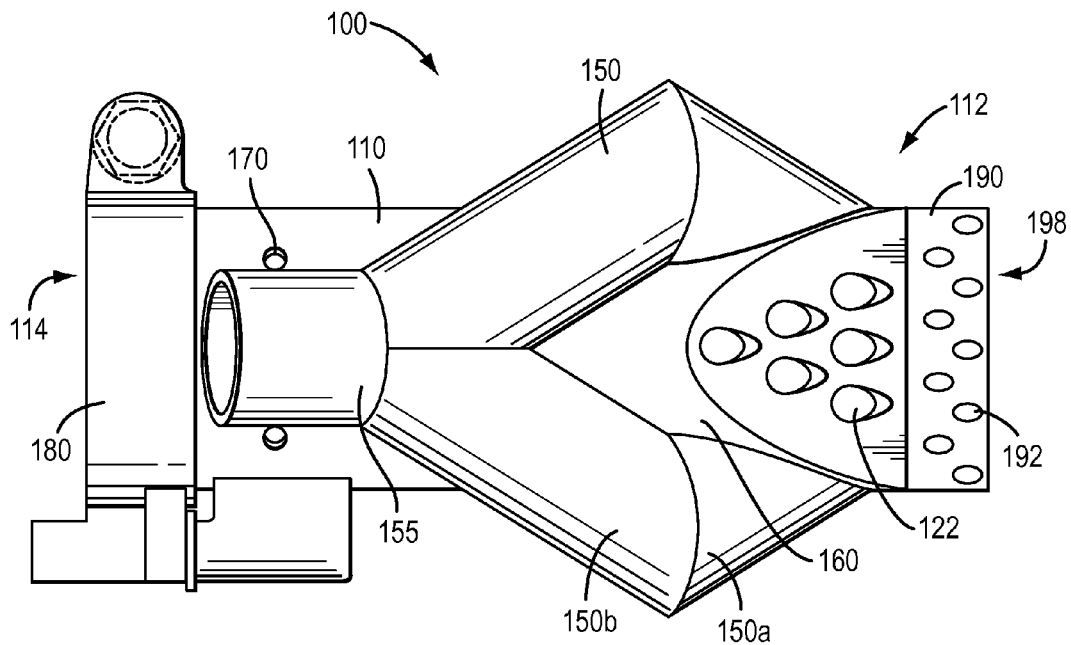
FIG. 1 depicts a top view of an embodiment of the invention.

Referring to FIG. 1, a top view of a device for collecting dust from a power tool 100 is illustrated according to an embodiment of the invention. The device 100 comprises a housing 110 that may have a substantially cylindrical shape. The housing 110 has a first end 112 that tapers to a tool bit opening 198. The angle and length of the taper may be of any angle or length, but is preferably such that the first end 112 may fit into narrow areas, such as corners of a room or underneath the toe-kick of cabinets. The first end 112 has a plurality of suction ports 122 through which air and dust may flow into the housing 110. A second end 114 of the housing 110 is configured to couple to a power tool. In one embodiment, a clamp 180 is used to couple the housing 110 to the power tool. A plurality of air intake passages 150 are shown coupled to an exterior surface 160 of the housing 110. The air intake passages 150 are coupled to an exit passage 155. The exit passage 155 is configured to couple to a vacuum. The exit passage 155 may be configured to couple to an interior or exterior of a vacuum hose, or may couple to the vacuum by any other method known in the art.

In some embodiments, the housing 110 may be rectangular, or any other shape capable of coupling to a power tool. The housing 110 may be narrower than illustrated if it is to be coupled to a smaller power tool, or conversely the housing 110 may be broader than illustrated to fit larger tools. In one embodiment the housing 110 may be significantly elongated to fit power tools with long bodies or long actuating distances. In one embodiment the housing 110 may be significantly shorter to fit power tools with a short body or a short actuating distance from the body to the operating end of the power tool. In one embodiment the housing 110 may have suction ports 122 located along any part of its length. The housing 110 may also be referred to as a sheath or a casing.

The air intake passages 150 are shown coupled to opposite sides of the housing 110. The air intake passages 150, or vacuum channels, may be positioned to maximize the effectiveness of the air flow through the suction ports 122. Additionally, by positioning the air intake passages 150 adjacent to the first end 112, the dust is collected before coming in contact with the power tool, preventing damage and reducing maintenance to the power tool. The use of multiple air intake passages 150 may increase the amount of dust that is capable of being removed from the local atmosphere. In other embodiments, the air intake passages 150 may be located at different positions. For example, the air intake passages 150 may be located adjacent to the second end 114 in order to allow the device 100 to reach narrow access areas. The air intake passages 150 may be curved such that they come together. Alternatively, the air intake passages may be straight or comprise a plurality of straight sections such that they meet at or near the exit passage 155. In one embodiment, the air intake passages 150 do not meet at a common exit passage 155, but rather have separate exit passages 155 that each couple to a vacuum source. Additionally, more than two air intake passages 150 may be used to improve the distribution of air flow throughout the device 100, reducing the chances of clogging.

In the illustrated embodiment, each air intake passage 150 comprises a first passage sections 150a, and a second passage section 150b. The two passage sections 150a, 150b are substantially straight, and the first passage sections 150a couple to the exterior surface 160 of the housing 110. The second passage sections 150b are coupled to the exit passage 155.

The first end 112 of the housing 110 comprises at least one suction port 122. The suction ports 122, or suction holes, as shown are circular, however they may be of any shape such as square, elliptical, or rectangular. There may be any number of suction ports 122. For example, there may be a large enough amount of suction ports 122 such that the first end 112 may essentially comprise a screen or grating. While some dust may be collected through the tool bit opening 198, much of the dust is collected through the suction ports 122. The suction ports 122 focus the air flow around the first end 112 such that nearly all ambient dust particles are removed from the local area. This prevents dust from contaminating nearby areas or escaping into the atmosphere. Rather than being formed at an angle perpendicular to the first end 112, the suction ports 122 may be formed substantially parallel to a central axis of the housing 110. This horizontal angle allows the air to flow into the housing 110 with fewer turns, increasing the effectiveness of the dust removal.

The device 100 further comprises a lip 190. The lip 190 may be made of a durable material such as case-hardened steel, heat-treated steel, or any other material known to one of ordinary skill in the art. The lip 190 is coupled to the first end 112 of the housing 110. The lip 190 comprises the tool bit opening 198, which extends from the first end 112 of the housing 110 through the lip 190 and allows air to flow through the lip 190 and into the housing 110. The lip may further comprise lip suction ports 192. The lip suction ports 192 allow air to flow through, collecting dust and providing a source of ambient air to cool a tool bit which may extend through the lip 190.

Over an extended period of time, the lip 190 may deteriorate from prolonged use. When the lip 190 is significantly worn out, it may be detached from the housing 110 and a new lip may be installed. This allows the device 100 to have a longer lifespan. The new lip may be welded to the device 100 or attached by any other way known to one of ordinary skill in the art. Alternatively, the device 100 may be used without a lip 190.

The device 100 further comprises vent holes 170. In this embodiment, two vent holes 170 are located on a top portion of the housing 110 and proximate to the second end 114. However, any number of vent holes 170 may be used, and they may be located on the side or lower portion of the housing 110, or further from the second end 114. The vent holes 170 allow air to flow through the housing 110 in a direction from the second end 114 toward the first end 112. This air flow prevents dust and debris from accumulating inside the first end 114 of the housing 110. This keeps the dust and debris from interfering with any power tool, such as a chipping hammer, which is coupled to the device 100, improving the functionality and lifetime of the power tool. Additionally, the vent holes 170 allow cool air to flow into the housing 110 to cool the power tool and the device 100.

Figure 2:
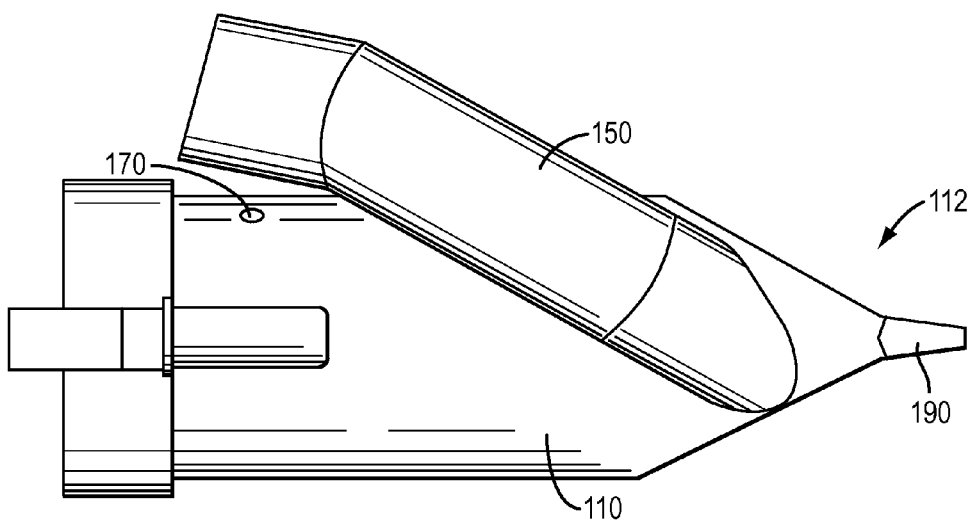
FIG. 2 depicts a side view of an embodiment of the invention.

Referring to FIG. 2, a side view of the device 100 is illustrated according to an embodiment of the invention. The air intake passages 150 are shown extending away from the first end 112 at an angle relative to the housing 110. The angle of the air intake passages 150 may vary according to the desired purpose of the device 100. For example, in embodiments designed to fit into narrow locations, the air intake passages 150 may be positioned at a lesser angle relative to the housing 110 such that the device 100 has a smaller cross-sectional area near the first end 112. The lip 190 may also be tapered. Although only on the top of the housing 110 in this embodiment, the vent holes 170 may also be located substantially at the bottom or sides of the housing 110.

Figure 3:
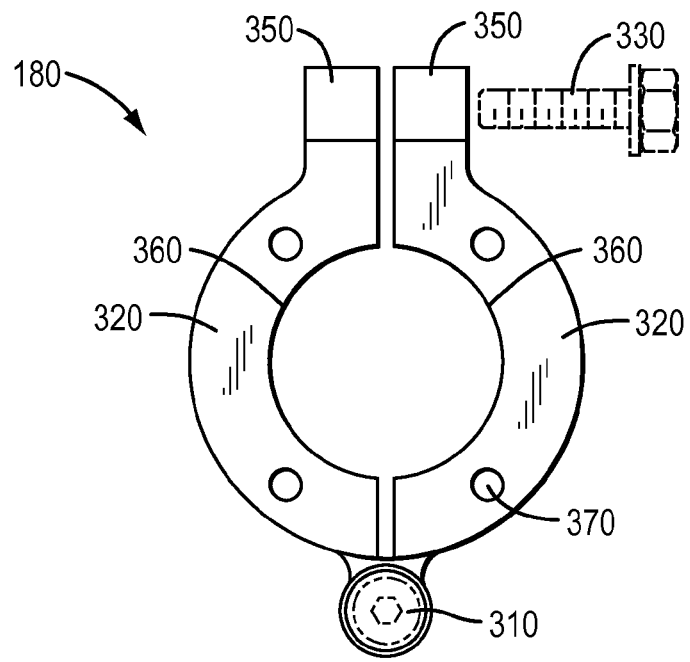
FIG. 3 depicts a clamp according to an embodiment of the invention.

Referring to FIG. 3, a rear view of the clamp 180 is illustrated according to an embodiment of the invention. The clamp 180 may comprise a hinge 310, two collar members 320, a bolt 330, and neck portions 350. The clamp 180 is designed to quickly attach and detach the device 100 from a power tool. The clamp 180 may further comprise a nut which may be coupled to the neck portions 350 such that the nut remains in place when the nut and bolt 330 are not engaged. Alternatively, the nut may be a separate detachable piece. The bolt 330 may thread into the nut, or alternatively the neck portions 350 may be threaded such that the bolt 330 engages with the neck portions 350, and the nut is not required. The bolt 330 may comprise a locking cam, in which the bolt 330 requires no tools to tighten and loosen the clamp 180. In another embodiment, the bolt 330 comprises a cotter pin to keep it in place. The bolt 330 may further comprise a retaining member that couples to the bolt 330 between the neck portions 350 such that the bolt remains coupled to a neck portion 350 when not engaged with the opposing neck portion 350. An interior portion 360 of the collar members 320 may comprise an elastic material such as rubber in order to make a tight connection with the power tool. Alternatively, an interior portion 360 of the collar members 320 may be comprised of steel, machined to make a tight connection with the power tool. The clamp may further comprise clamp vent holes 370. The clamp vent holes 370 may be located on the collar members 320 and have a similar function to the vent holes 170.

Figure 4:
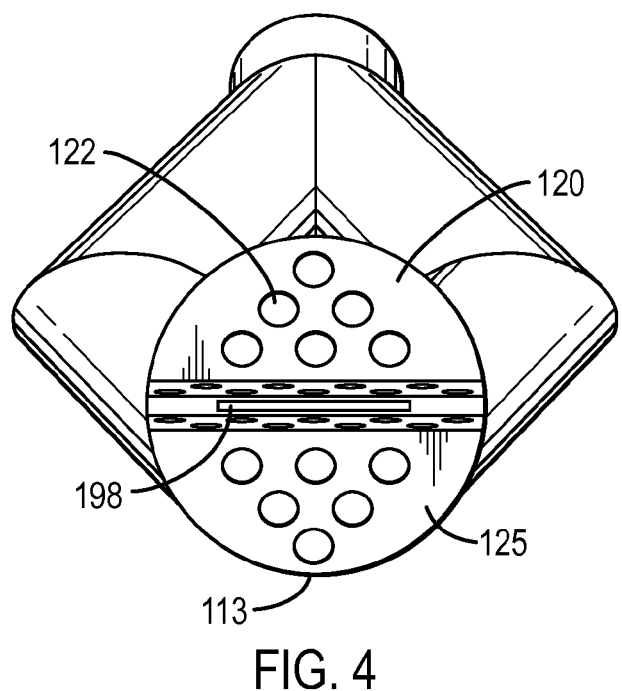
FIG. 4 depicts a front view of an embodiment of the invention.

Referring to FIG. 4, a front view of the device 100 is shown according to an embodiment of the invention. In this embodiment, the device 100 comprises a first face 120 and a second face 125. The first face 120 and the second face 125 may be substantially planar, or one or both may be curved. The first face 120 lies substantially in a first plane, and the second face 125 lies substantially in a second plane. The planes may form an acute angle, and the first face 120 and the second face 125 are non-intersecting. One or both faces 120, 125 may form an obtuse angle with the housing 110.

One end of the tool bit opening 198 is defined between the first face 110 and the second face 125. In the illustrated embodiment, the tool bit opening is substantially elongated. In this embodiment, the tool bit opening 198 may have a length at least twice as large as its width. However, in other embodiments the relative dimensions may be any ratio sufficient to allow a tool bit to pass through. The tool bit opening 198 in this embodiment may allow a tool bit such as a chisel to pass through. In other embodiments the tool bit opening 198 may be narrower. For example, in an embodiment where the first end 112 is substantially conical, the tool bit opening 198 may be substantially circular, allowing a tool bit such as a drill bit to pass through. In one embodiment either the first face 120, the second face 125, or both faces 120, 125 may be covered by a protective plate. The protective plate may be comprised of the same material as any other part of the device 100 or may be comprised of a different material. In another embodiment the first face 120, the second face 125, or both may be comprised of a single plate or multiple plates. Such plates may be detachable to allow for multiple configurations or replacement of the plates when damaged or may be permanently attached to the device 100.

In the illustrated embodiment, the first face 120 and the second face 125 are substantially symmetrical. However, it is also contemplated that the first face 120 and the second face 125 are asymmetrical. For example, the second face 125 may be substantially parallel to the housing 110, such that the first plane and the second plane intersect closer to a bottom portion 113 of the device 100. Additionally, in the illustrated embodiment, the suction ports 122 are located on both the first face 120 and the second face 125. In other embodiments, the suction ports 122 may be located on only the first face 120 or the second face 125.

Figure 5:
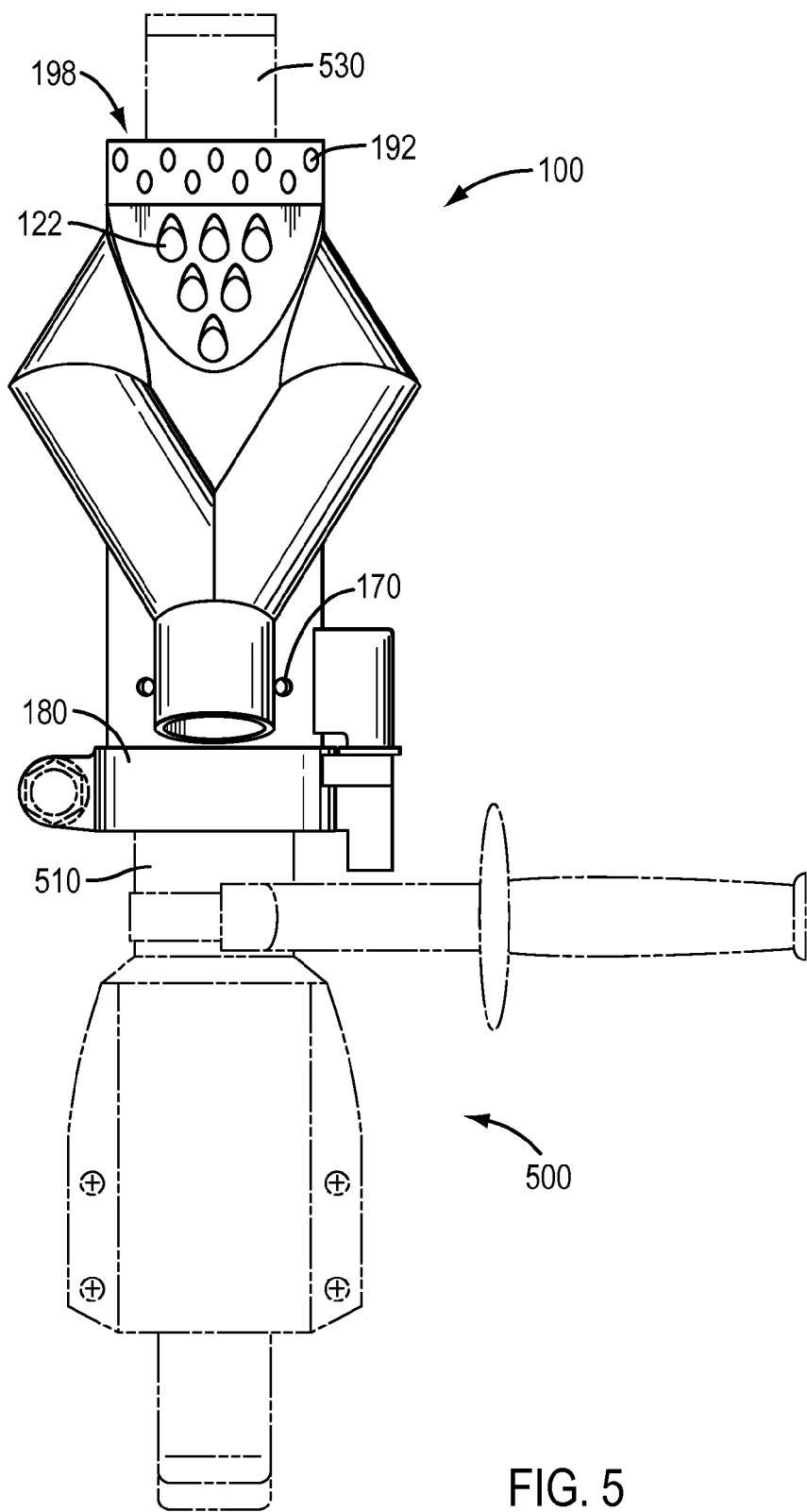
FIG. 5 depicts a top view of a device coupled to a power tool according to an embodiment of the invention.
Figure 6:
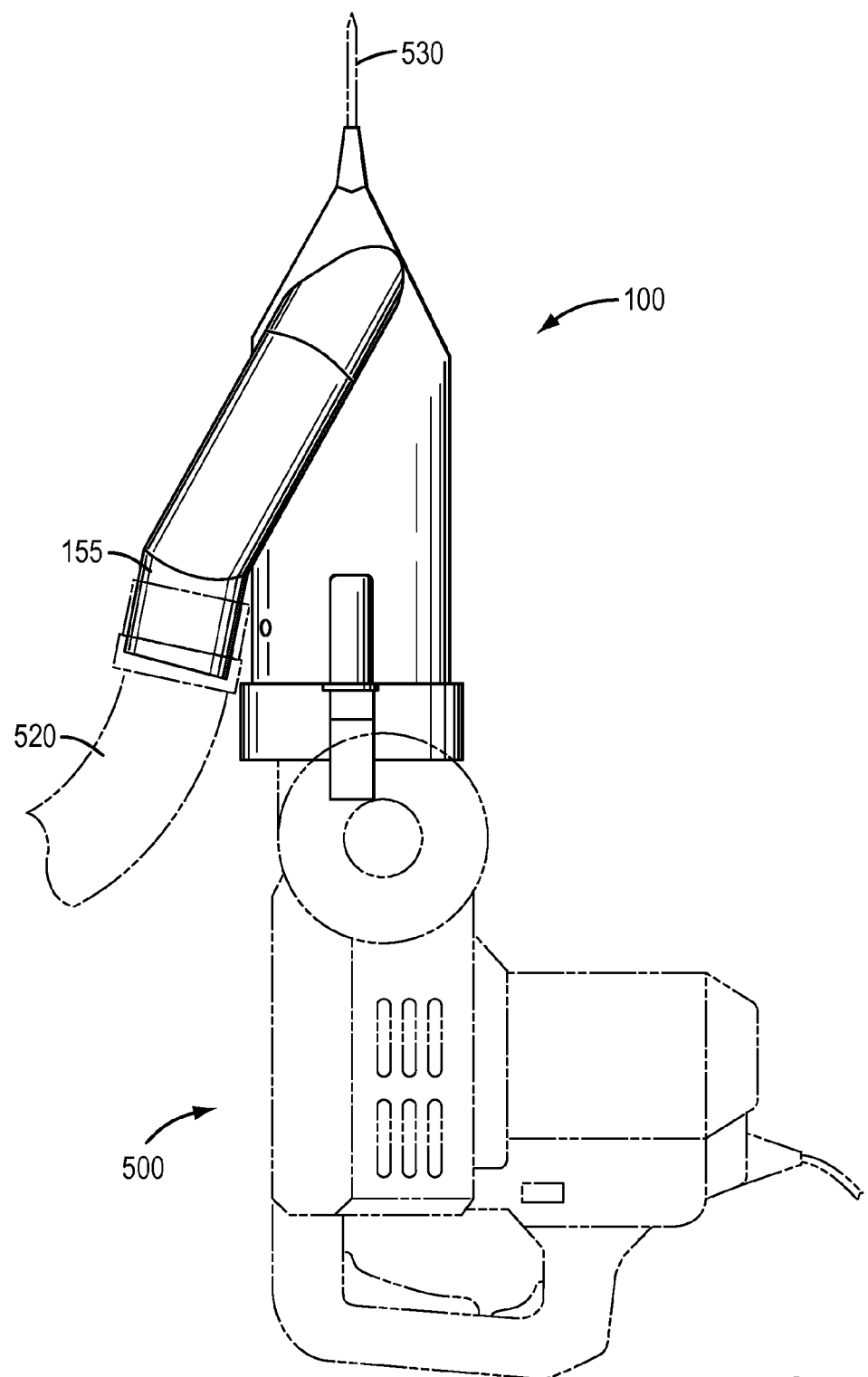
FIG. 6 depicts a side view of a device coupled to a power tool according to an embodiment of the invention.

Referring to FIG. 5 and FIG. 6, a top and side view of the device 100 coupled to a chipping hammer 500 are illustrated.

The clamp 180 couples securely to the body 510 of the chipping hammer 500. The device 100 may also be coupled to many other types of power tools including, but not limited to drills, hammer drills, grinders, sanders, dremmels, power saws, or jackhammers. A vacuum hose 520 is shown coupled to the exit passage 155. The vacuum hose may fit around an exterior of the exit passage 155, or fit inside the exit passage 155, or couple by any other means known to one of ordinary skill in the art.

In this embodiment, the chipping hammer 500 is coupled to a tool bit 530. The tool bit 530 in the illustrated embodiment is a chisel, but may be any other type of tool bit. The tool bit 530 extends through the tool bit opening 198. When in operation, the tool bit 530 chips away tile or other material, and resultant dust is removed from the ambient air through the suction holes 122, tool bit opening 198, and vent holes 170.

Figure 7:
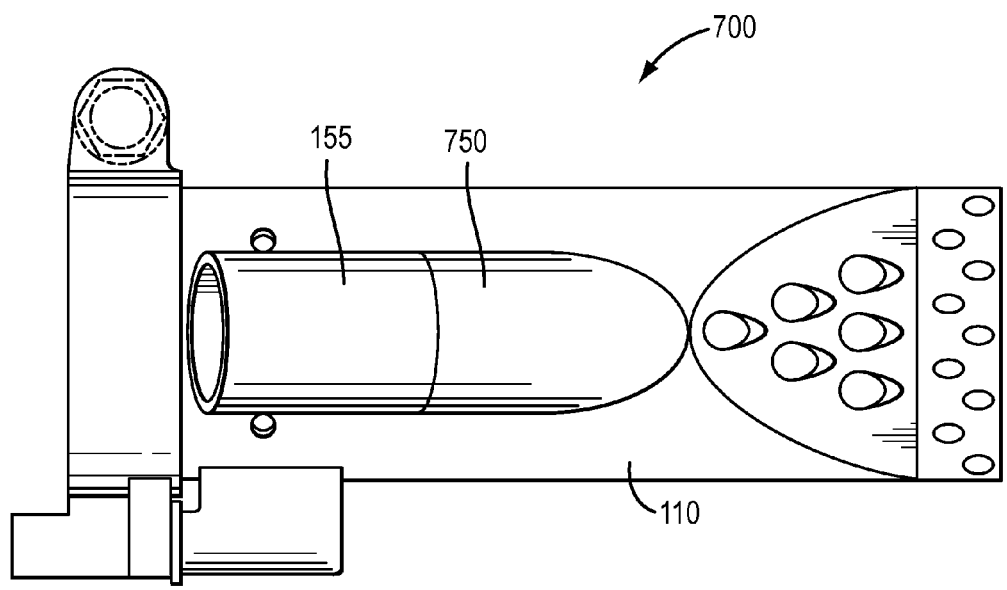
FIGS. 7-9 depict a top, side, and front view of an embodiment of the invention.
Figure 8:
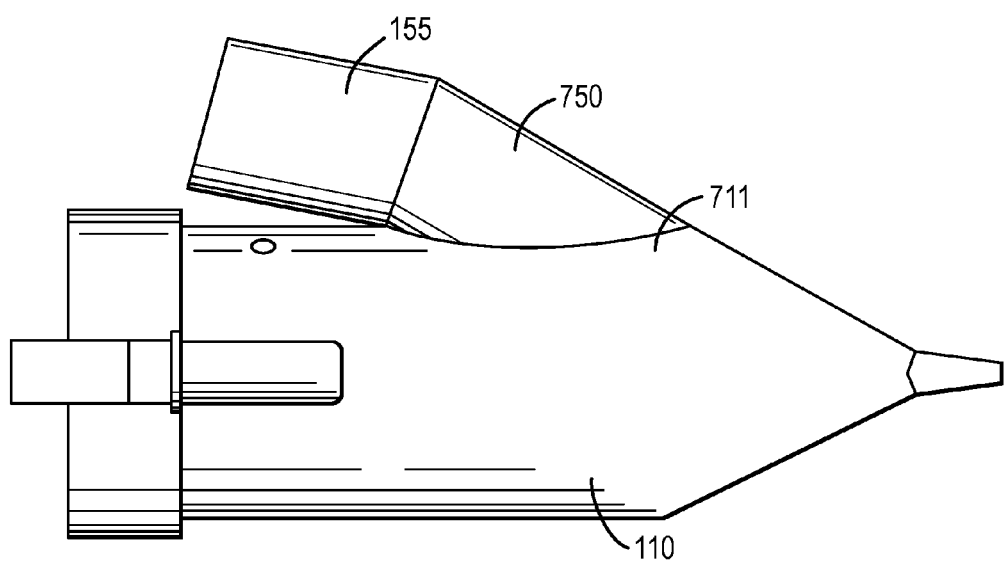
Figure 9:
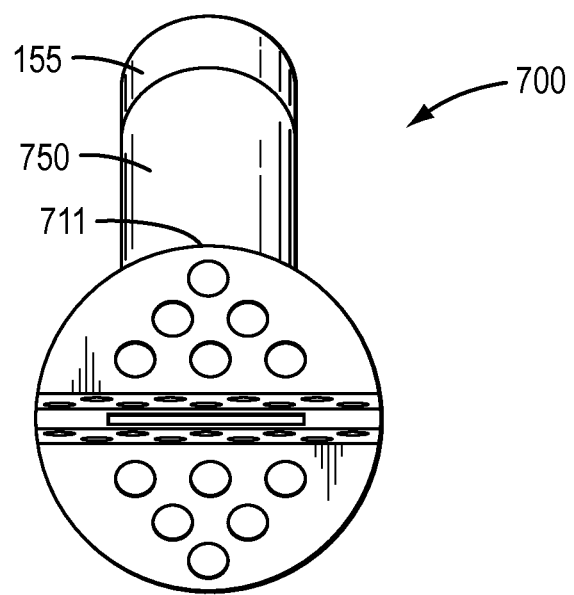

Referring to FIGS. 7-9, a top, side, and front view of another embodiment of the invention are illustrated. In this embodiment, a device 700 comprises a single air intake passage 750 coupled to the housing 110. In this embodiment, the air intake passage 750 is a straight section. However, it may also be curved or comprise several angled sections. The air intake passage 750 may be cylindrical, or any other desired shape. The air intake passage 750 is coupled to the exit passage 155. The air intake passage 750 may be coupled to a top portion 711 of the housing 110.

Figure 10:
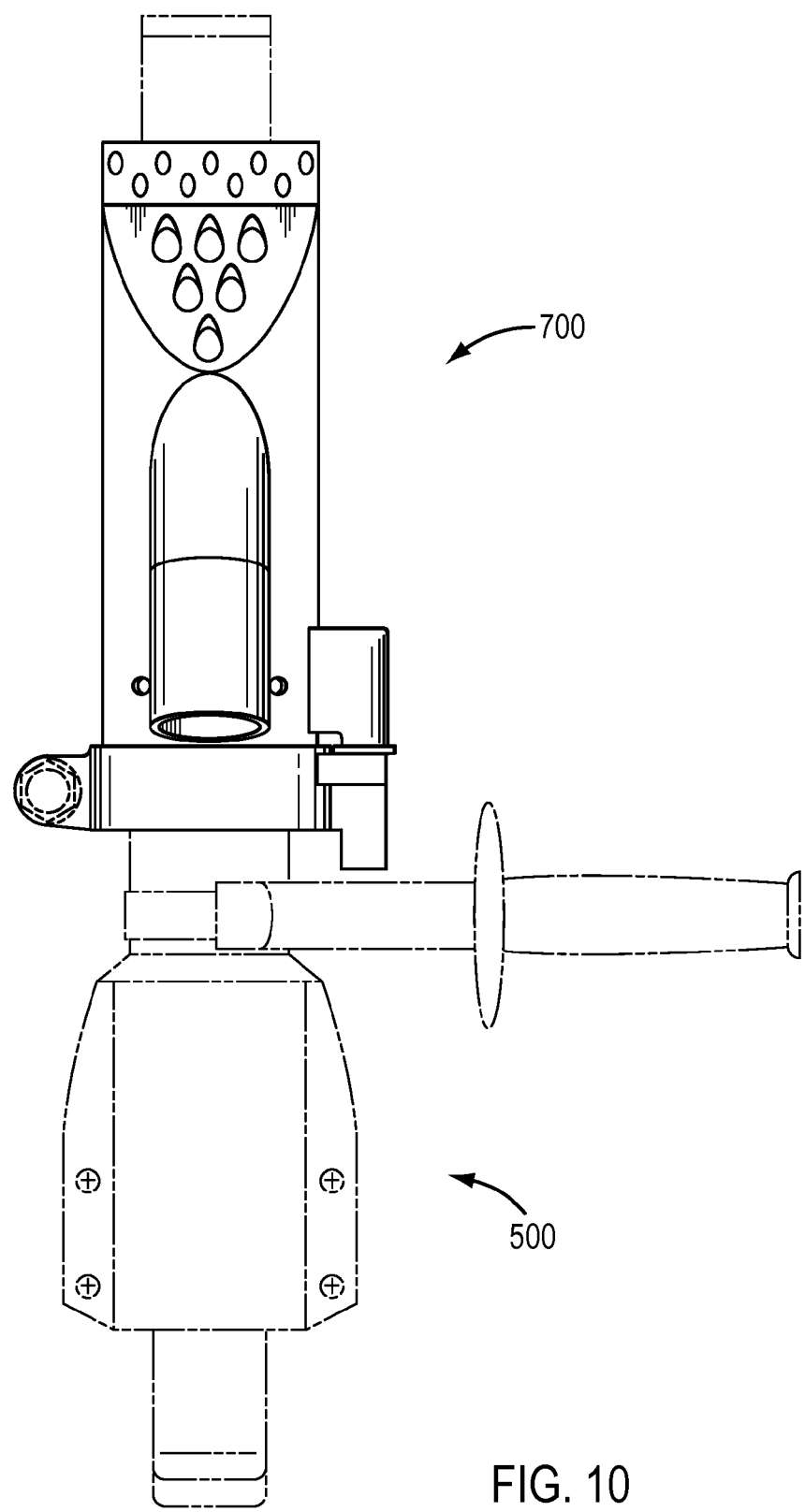
FIG. 10 depicts a top view of a device coupled to a power tool according to an embodiment of the invention.

Referring to FIG. 10, a top view of the device 700 coupled to a chipping hammer 500 is illustrated according to an embodiment of the invention.

Figure 11:
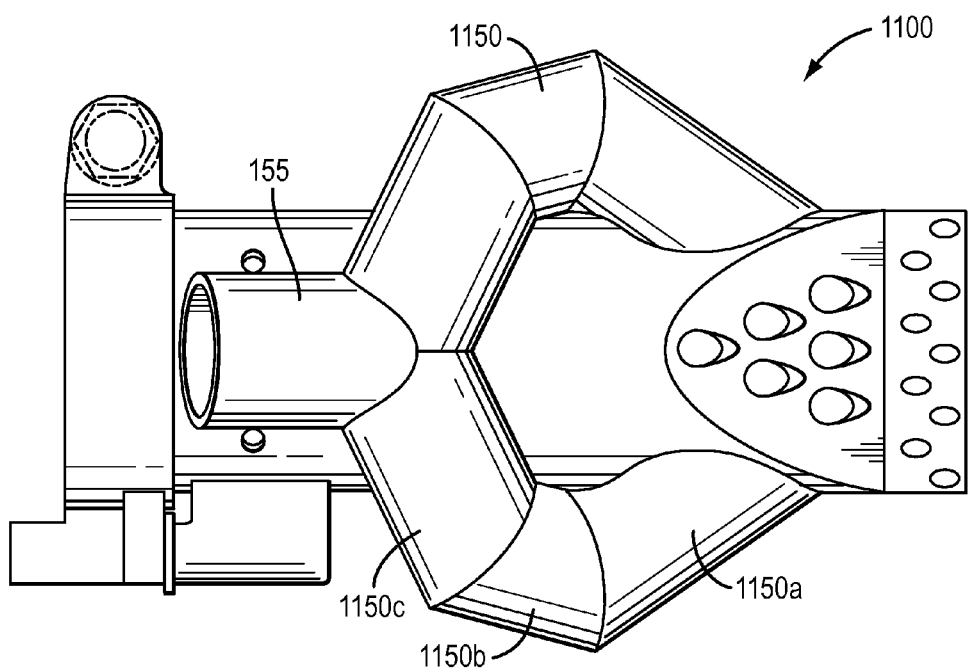
FIGS. 11-13 depict a top, side, and front view of an embodiment of the invention.
Figure 12:
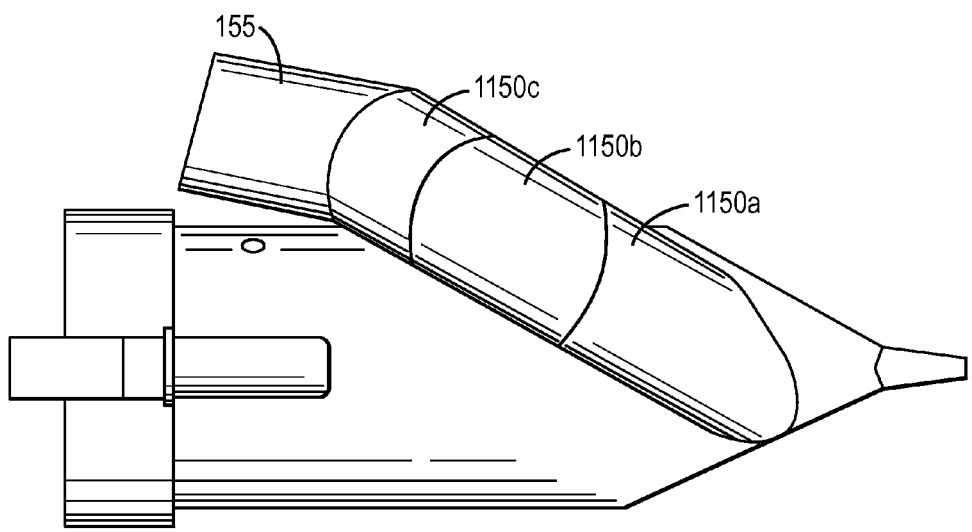
Figure 13:
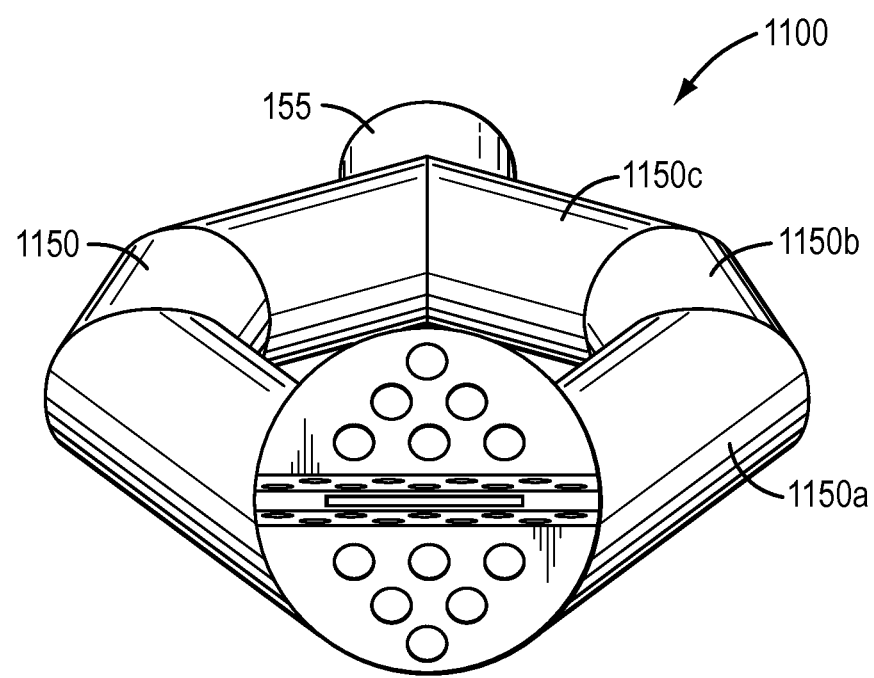

Referring to FIG. 11 through FIG. 13, a top, side, and front view of a device 1100 is illustrated according to an embodiment of the invention. In this embodiment, two air intake passages 1150 each comprise three straight sections 1150a, 1150b, and 1150c. The air intake passages 1150 are coupled together and also coupled to the exit passage 155.

Figure 14:
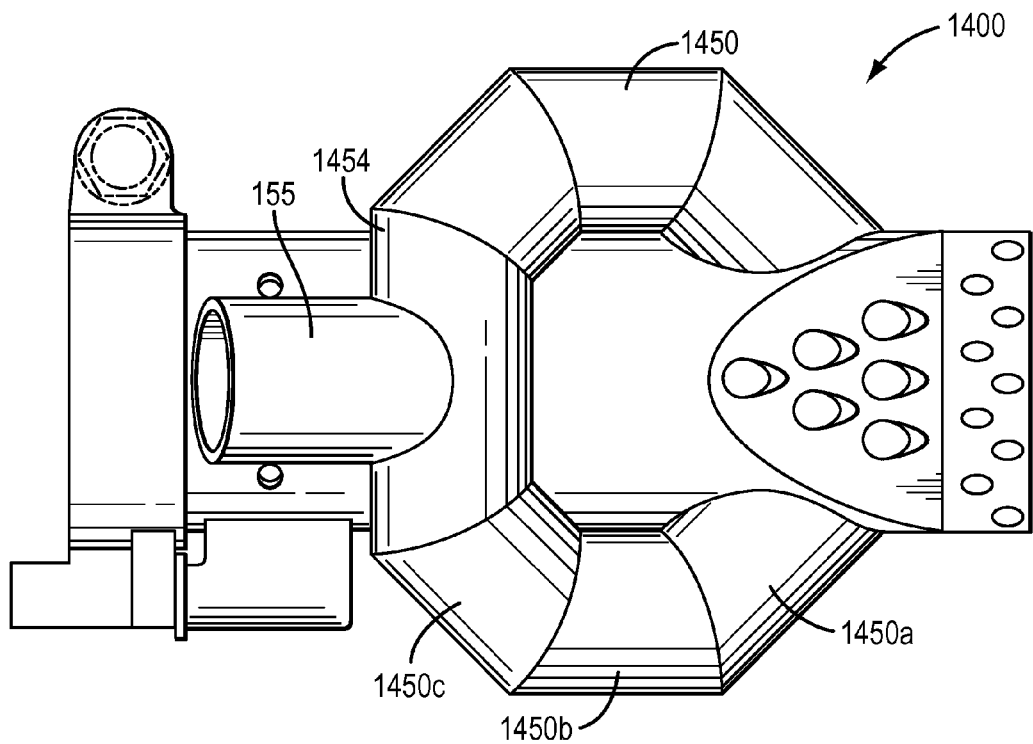
FIGS. 14-16 depict a top, side, and front view of an embodiment of the invention.
Figure 15:
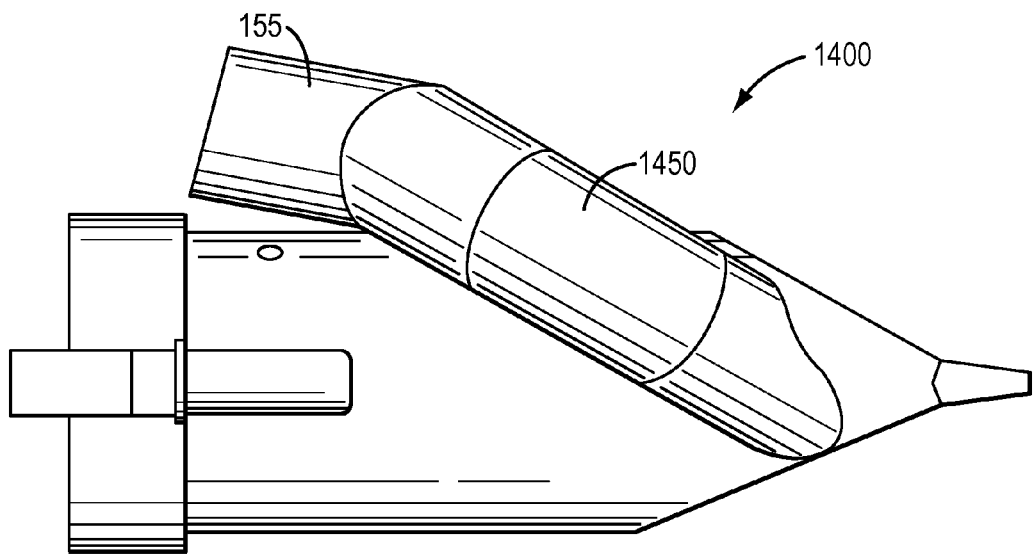
Figure 16:
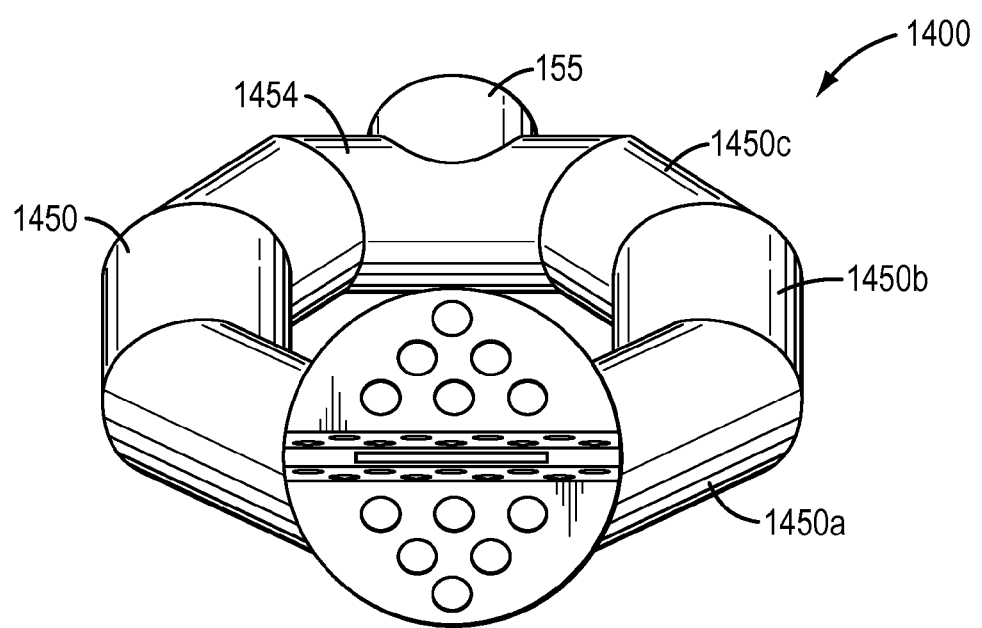

Referring to FIG. 14 through FIG. 16, a top, side, and front view of a device 1400 is illustrated according to an embodiment of the invention. The device 1400 comprises two air intake passages 1450. Each air intake passage 1450 comprises three straight sections 1450a, 1450b, and 1450c. A connecting section 1454 is coupled to the two air intake passages 1450. The connecting section 1454 is coupled to the exit passage 155.

Figure 17:
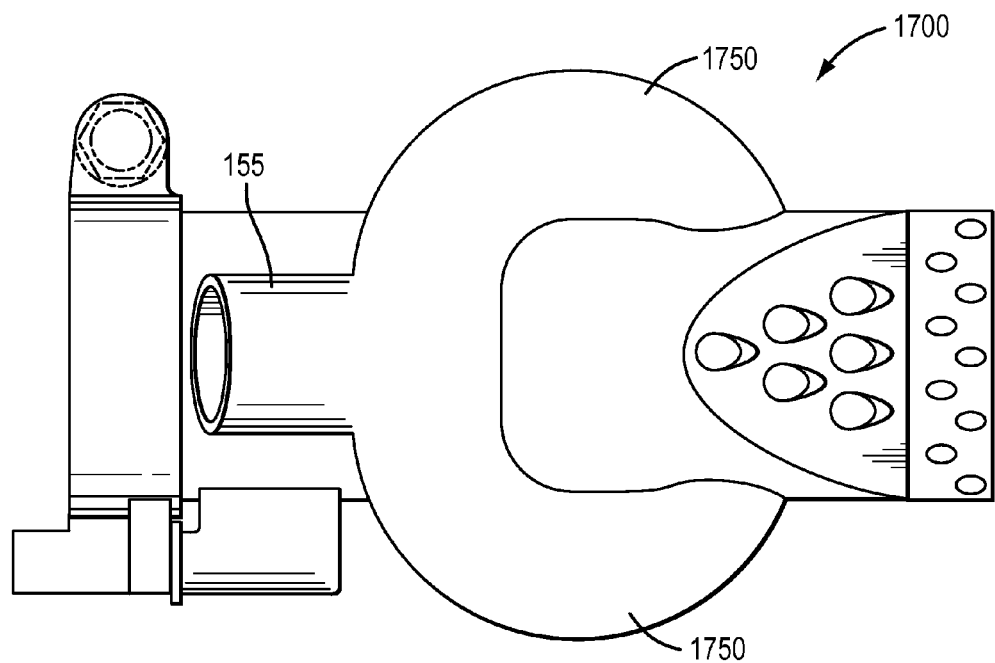
FIGS. 17-19 depict a top, side, and front view of an embodiment of the invention.
Figure 18:
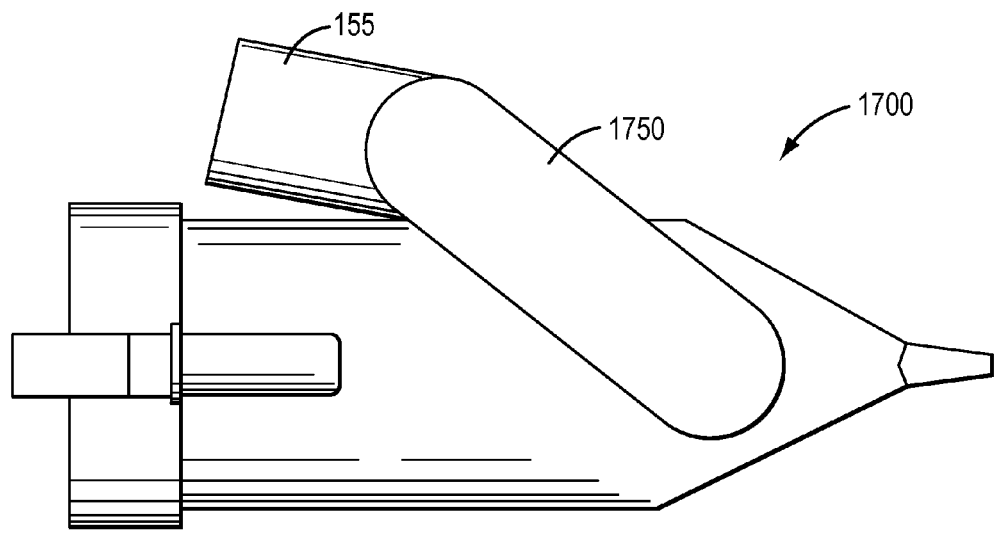
Figure 19:
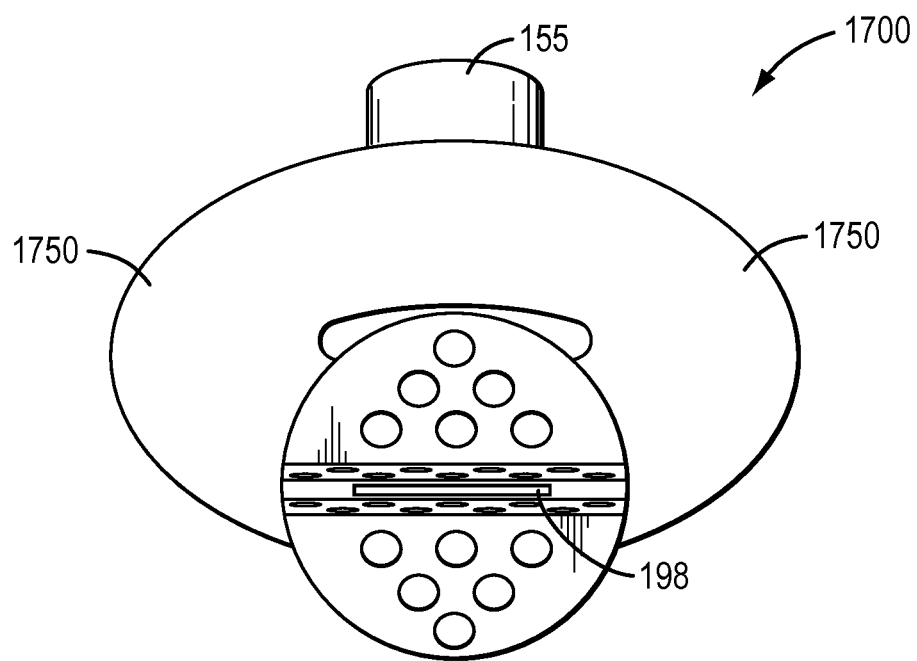

Referring to FIG. 17 through 19, a top, side, and front view of a device 1700 is illustrated according to an embodiment of the invention. The device 1700 comprises to air intake passages 1750. The air intake passages 1750 in this embodiment are substantially curved. The air intake passages 1750 are coupled to the exit passage 155. In this embodiment, a length of the tool bit opening 198 is at least twice as large as a width W of the tool bit opening.

Figure 20:
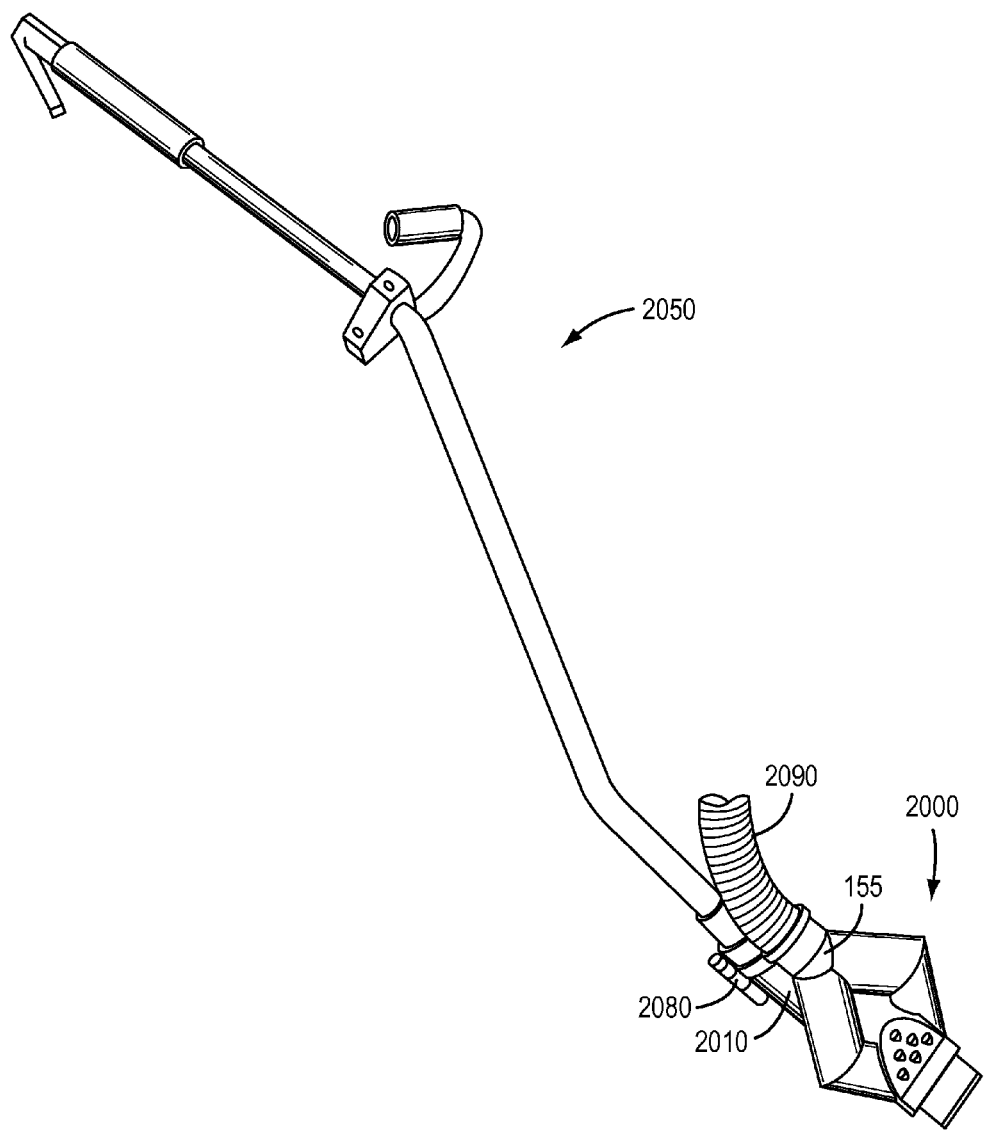
FIG. 20 depicts a device coupled to a stand-up power tool according to an embodiment of the invention.

Referring to FIG. 20, a device 2000 coupled to a stand-up chipping hammer 2050 is illustrated according to an embodiment of the invention. In this embodiment, the device 2000 is similar to the device 100 illustrated in FIG. 1. However, a housing 2010 may be narrower than the housing 110 of FIG. 1 in order to correctly fit the stand-up chipping hammer 2050. Alternatively, a clamp 2080 may be designed such that the clamp 2080 couples securely to any power tool, such as the stand-up chipping hammer 2050, which has a diameter different than that of the housing 2010. In this manner, a single device 2000 may be used on a large number of different power tools. A vacuum hose 2090 is shown coupled to the exit passage 155.

Figure 21:
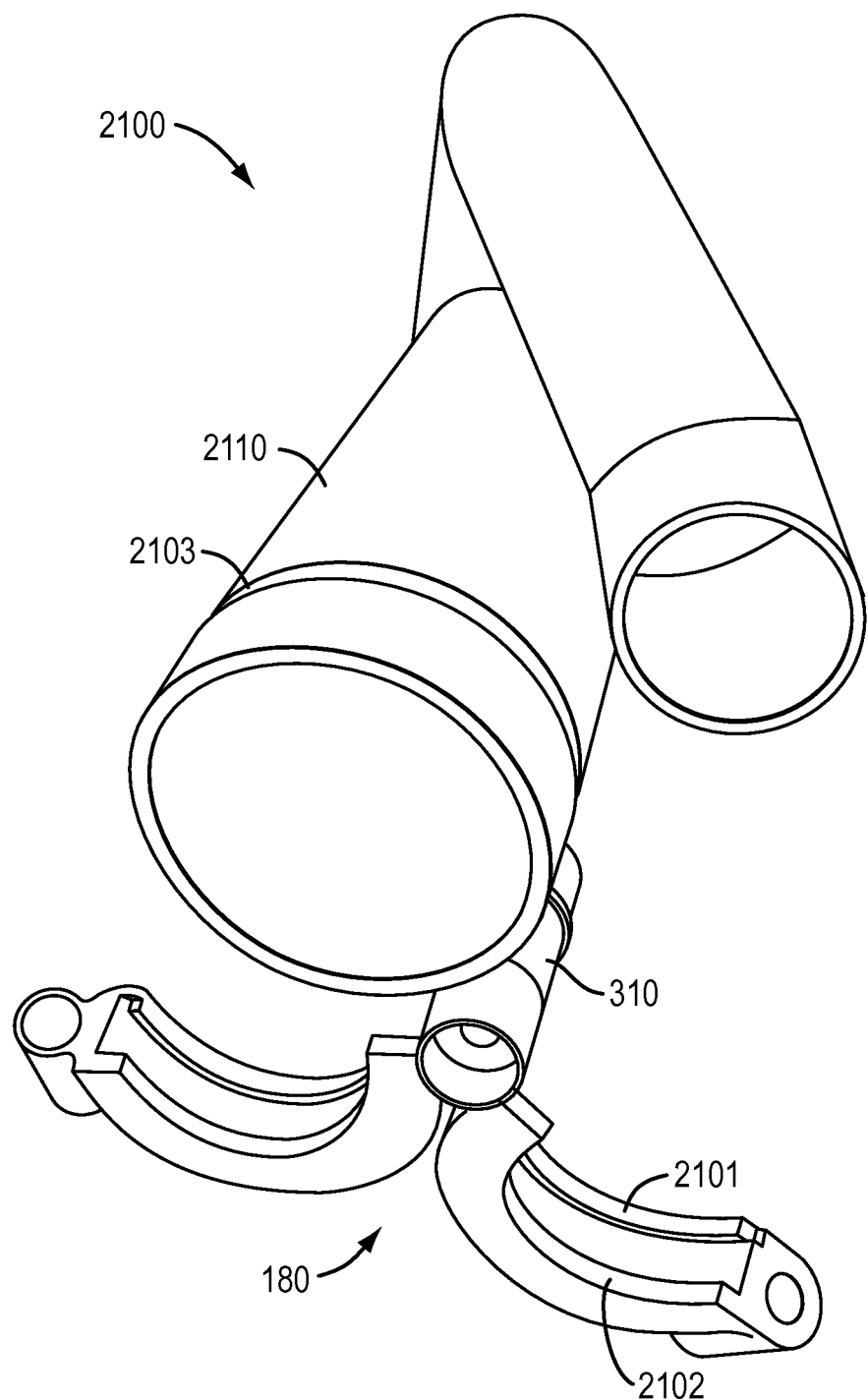
FIG. 21 depicts a perspective view of a device with an open clamp according to an embodiment of the invention.

Referring to FIG. 21, a perspective view of a device 2100 is illustrated according to an embodiment of the invention. The clamp 180 is illustrated in the open position. The clamp 180 comprises a first tongue 2101 and a second tongue 2102. The first tongue 2101 is configured to fit into a groove 2103 on a housing 2110. The second tongue 2102 is configured to grip tightly to a power tool. The second tongue 2102 may be designed to have any radius so that it may secure to any size power tool. The clamp 180 further comprises the hinge 310 which is coupled to the housing 2110. The hinge 310 comprises a bolt that allows the clamp 180 or hinge 310 to be removed if desired. When the clamp 180 is in the open position, the clamp 180 remains coupled to the housing 2110. This prevents any parts of the clamp 180 from being lost, and also allows the device 2100 to be attached and detached from a power tool in less time.

Figure 22:
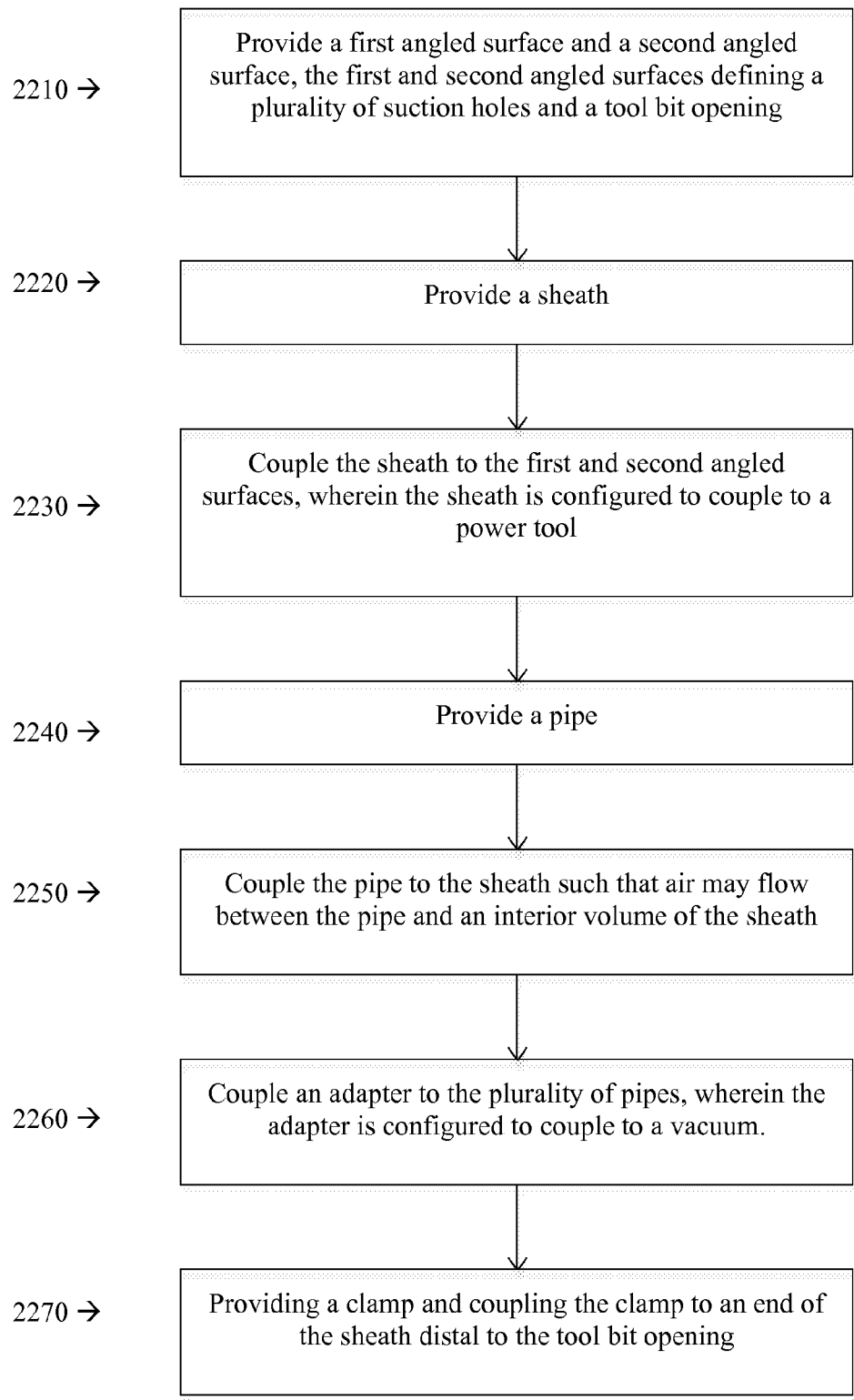
FIG. 22 depicts a method of making a device according to an embodiment of the invention.

Referring to FIG. 22, the invention discloses a method for manufacturing a device for collecting dust from a power tool. The method comprises providing a first angled surface and a second angled surface 2210. The first and second angled surfaces may also be referred to as faces. The first and second angled surfaces define a plurality of suction holes and a tool bit opening. A sheath is provided 2220, and the sheath is coupled to the first and second angled surfaces 2230. The sheath is further configured to couple to a power tool. A pipe is provided 2240, and the pipe is coupled to the sheath such that air may flow between the pipe and an interior volume of the sheath 2250. An adapter is provided, and the adapter is coupled to the pipe and configured to couple to a vacuum 2260. A clamp is provided and coupled to an end of the sheath distal to the tool bit opening 2270.

The various components may be coupled by any method known in the art. In one embodiment, where the device 100 is comprised primarily of steel or aluminum, the components may be welded together. Alternatively, they may be bolted, riveted, screwed, glued, or attached by any other method. In one embodiment some components may comprise plastic and the components may be clamped together. In one embodiment, the components are manufactured with a CNC machine. The components may also be case hardened or heat treated in order to maximize their durability.

I claim:

1. A device for collecting dust from a power tool comprising:
    a housing, having a substantially cylindrical shape, with a first end that comprises at least two substantially planar surfaces, and tapers to an opening for a tool bit and that has at least one suction port opening into an interior volume of the housing, and an opposing second end configured to couple to a power tool;
    An air intake passage attached to the exterior surface of the housing body such that an interior volume of the air intake passage connects to an interior volume of the housing; and
    an exit passage coupled to the air intake passage and configured to couple to a vacuum.

2. The device of claim 1, further comprising a lip coupled to the first end of the housing.

3. The device of claim 1, wherein a clamp is coupled to the second end of the housing.

4. A device for collecting dust from a power tool comprising:
    a housing, having a substantially cylindrical shape, with a first end that tapers to an opening for a tool bit, wherein a length of the opening for the tool bit is at least twice as large as a width of the opening for the tool bit, and that has at least one suction port opening into an interior volume of the housing, and an opposing second end configured to couple to a power tool;

a air intake passage attached to the exterior surface of the housing body such that an interior volume of the air intake passage connects to an interior volume of the housing; and an exit passage coupled to the air intake passages and configured to couple to a vacuum.

5. The device of claim 4, comprising a plurality of air intake passages.

6. A power tool accessory for vacuuming dust comprising:
a first face and a second face, wherein the first face substantially lies within a first plane and the second face substantially lies within a second plane, the planes form an acute angle, the faces are non-intersecting, and at least one of the faces defines at least one suction port;
a casing coupled to the faces and configured to couple to a power tool;
a vacuum channel coupled to an exterior surface of the casing; and
an exit channel coupled to the vacuum channels and configured to couple to a vacuum.

7. The power tool accessory of claim 6 further comprising a clamp to couple the casing to a power tool.

8. The power tool accessory of claim 6 wherein the faces are coupled to the casing by a weld.

9. The power tool accessory of claim 6 wherein both faces define a plurality of suction ports.

10. The power tool accessory of claim 6 wherein the vacuum channel is curved.

11. The power tool accessory of claim 6 wherein one of the faces forms an obtuse angle with the interior of the casing.

12. The power tool accessory of claim 6 wherein the faces, the casing and the vacuum channels comprise substantially the same material.

13. The power tool accessory of claim 6 wherein the casing comprises steel.

14. A method for manufacturing a device for collecting dust from a power tool comprising:
providing a first angled surface and a second angled surface, the first and second angled surfaces defining a plurality of suction holes and a tool bit opening;
providing a sheath;
coupling the sheath to the first and second angled surfaces, wherein the sheath is configured to couple to a power tool;
providing a pipe;
coupling the pipe to the sheath such that air may flow between the pipe and an interior volume of the sheath; and
coupling an adapter to the pipe, wherein the adapter is configured to couple to a vacuum.

15. The method of claim 14, wherein two pipes are coupled to the sheath.

16. The method of claim 14, wherein the sheath, the pipes, and the adapter are comprised of substantially the same material.

17. The method of claim 14 further comprising providing a clamp and coupling the clamp to an end of the sheath distal to the tool bit opening.

18. The method of claim 14, further comprising case-hardening or heat-treating the device.

* * * * *